(12) United States Patent
Miersch-Wiemers

(10) Patent No.: US 8,443,783 B2
(45) Date of Patent: May 21, 2013

(54) INTERNAL COMBUSTION ENGINE THAT CAN BE OPERATED WITH DIFFERENT TYPES OF LIQUID FUEL

(75) Inventor: Oliver Miersch-Wiemers, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 390 days.

(21) Appl. No.: 12/742,536

(22) PCT Filed: Oct. 10, 2008

(86) PCT No.: PCT/EP2008/063603
§ 371 (c)(1),
(2), (4) Date: May 12, 2010

(87) PCT Pub. No.: WO2009/062795
PCT Pub. Date: May 22, 2009

(65) Prior Publication Data
US 2010/0252004 A1 Oct. 7, 2010

(30) Foreign Application Priority Data
Nov. 12, 2007 (DE) .......................... 10 2007 000 878

(51) Int. Cl.
*F02B 7/02* (2006.01)
(52) U.S. Cl.
USPC ............. 123/431; 123/575; 123/1 A; 123/299

(58) Field of Classification Search .................. 123/299, 123/300, 304, 431, 27 GE, 525, 575, 198 A, 123/1 A, 456
See application file for complete search history.

(56) References Cited

U.S. PATENT DOCUMENTS

| | | | |
|---|---|---|---|
| 4,402,296 A | 9/1983 | Schwarz | |
| 5,775,282 A | 7/1998 | Smith | |
| 6,668,804 B2 * | 12/2003 | Dobryden et al. | 123/480 |
| 7,178,503 B1 | 2/2007 | Brehob | |
| 7,720,592 B2 * | 5/2010 | Leone et al. | 701/103 |
| 7,869,930 B2 * | 1/2011 | Stein et al. | 701/104 |
| 7,957,888 B2 * | 6/2011 | Leone et al. | 701/103 |
| 8,078,386 B2 * | 12/2011 | Stein et al. | 701/104 |
| 2007/0119412 A1 | 5/2007 | Leone et al. | |
| 2007/0234976 A1 | 10/2007 | Dearth et al. | |
| 2009/0024301 A1 * | 1/2009 | Volpato | 701/103 |

FOREIGN PATENT DOCUMENTS

DE 102006054081 A1 6/2007

\* cited by examiner

*Primary Examiner* — Hai Huynh
(74) *Attorney, Agent, or Firm* — Maginot, Moore & Beck

(57) ABSTRACT

The invention relates to an internal combustion engine that can be operated with different types of liquid fuel, which includes a device that can determine the current type of liquid fuel used. The invention further relates to a method for operating such an internal combustion engine. According to the invention, at least two different paths are provided, by which the liquid fuel can reach the combustion chamber of the internal combustion engine. The internal combustion engine comprises a control and regulation device, controlling or regulating the use of the different paths as a function of the type of the liquid fuel that was determined.

23 Claims, 3 Drawing Sheets

INTERNAL COMBUSTION ENGINE THAT CAN BE OPERATED WITH DIFFERENT TYPES OF LIQUID FUEL

CROSS-REFERENCE TO RELATED APPLICATION

This application is a 35 USC 371 application of PCT/EP2008/063603 filed on Oct. 10, 2008.

BACKGROUND OF THE INVENTION

1. Field of the Invention

The invention relates to an internal combustion engine that can be operated with different of liquid fuels, including in particular ethanol, methanol and gasoline, and to a method for operating such an engine.

2. Description of the Prior Art

So-called "flex-fuel injection systems" are known on the market. Such injection systems make it possible for vehicles to put ethanol, methanol, as well as gasoline in their tanks. With the aid of sensors or models, the particular fuel composition in the tank is detected. In accordance with this, engine operation is adapted by a control and regulating device, for instance by means of a specific adjustment of the instant of ignition, the instant of injection, and the injection quantity. In flex-fuel injection systems, accordingly, only a single tank is employed, in which the various fuel types ethanol, methanol and gasoline are stored either alone or in arbitrary mixture ratios. Thus when here and below different types of liquid fuels are mentioned, this includes both different fuels and different fuel mixtures.

OBJECT AND SUMMARY OF THE INVENTION

It is the object of the present invention to furnish an internal combustion engine of the type defined at the outset, and a method for its operation, so that compared to previous internal combustion engines, improved emission performance as well as fuel consumption are attained.

Different types of liquid fuels differ, among other ways, in their energy content. So that the engine can produce a defined torque, a greater quantity of one type of a liquid fuel must reach the combustion chamber per work cycle than is the case in a different type of liquid fuel. In the engine according to the invention, the requisite fuel quantity is split between the two different paths, over which the liquid fuel can reach the combustion chamber of the engine, in such a way that all in all the total demand of the engine to enable it to generate a desired torque is optimally covered. Splitting between the two paths is preferably done such that the emissions and fuel consumption are optimal.

Because two different paths are available, the additionally required fuel, for instance in operation with methanol or ethanol, which have a comparatively low energy content, can be made available without problems. Therefore neither of the two paths has to be designed for an especially high maximum quantity that in turn could adversely affect the accuracy of metering small quantities. The same is true for the delivery rate of a corresponding fuel pump. The pump can be designed for the particularly critical case of cold starting, so that the starting behavior of the engine is improved as well.

In a first refinement of the internal combustion engine according to the invention, it is proposed that a first path, over which the liquid fuel can reach the combustion chamber, includes at least a first injector, which injects the liquid fuel directly into the combustion chamber; and that a second path, over which the liquid fuel can reach the combustion chamber, includes at least one second injector, which injects the liquid fuel into an intake tube. In this refinement, direct injection is accordingly combined with an intake tube injection. Thus the provisions for optimizing emissions that are known from direct injection can be employed, such as the possibility of splitting the injection into various partial injections (preinjection, main injection, and postinjection), the adjustment of the timing of the onset of injection, and/or varying the injection pressure. An intake tube injection, conversely, offers advantages of partial load and high load at low engine rpm and expands the possibilities for heating a catalytic converter. Moreover, an additional intake tube injection can also be added to existing concepts of internal combustion engines without necessitating complex, expensive modifications of the engine. It is even conceivable to retrofit already existing engines with such additional intake tube injection and thus make them usable for flex-fuel.

Accordingly, thanks to the invention, it is necessary neither to enlarge the high-pressure pump of the direct injection system nor to design the injectors, which inject the fuel directly into the combustion chamber, for an increased flow rate (which could have adverse effects on small-quantity metering and would necessitate an increased end-stage power for triggering the injector), nor is an enlarged high-pressure fuel reservoir ("rail"), which could lead to problems with pressure buildup, especially in a high-pressure start, necessary. The additional intake tube injection can be achieved by installing merely a second low-pressure injector and a corresponding fuel allocator. All other components necessary for the intake tube injection are already present in an internal combustion engine that has direct injection.

At least one second injector can be associated with each intake tube leading to a combustion chamber. This would be equivalent to individual-cylinder injection, as is usual in intake tube injection systems ("ITI") that are conventional today. This makes especially quiet, low-emission operation of the engine possible. However, at least one second injector can be associated with an intake tube manifold that is associated with a plurality of combustion chambers, and this can be achieved economically.

Preferably, the first path (direct injection into a combustion chamber) is designed predominantly for injecting at least essentially pure gasoline. In practice; that should be the fuel predominantly used even in flex-fuel systems, which in most operating situations of the engine contributes to optimal engine operation. Then, each system by way of which the liquid fuel is injected into an intake tube is consistently directed above all to the additional demand for fuel in the form of ethanol and methanol and mixtures of gasoline, ethanol and methanol.

It is also advantageous if the control and regulating device additionally controls or regulates the use of the different paths as a function of at least one further operating parameter of the engine. Thus the advantages of the presence of two different paths is made usable, for instance for different engine operating situations, such as the improved mixture preparation, already mentioned above, in partial- and high-load operation at low engine rpm, as well as expanded catalytic converter heating provisions.

BRIEF DESCRIPTION OF THE DRAWINGS

Embodiments of the invention will be explained in further detail below in conjunction with the accompanying drawings. In the drawings.

DESCRIPTION OF THE PREFERRED EMBODIMENTS

Figure 1:
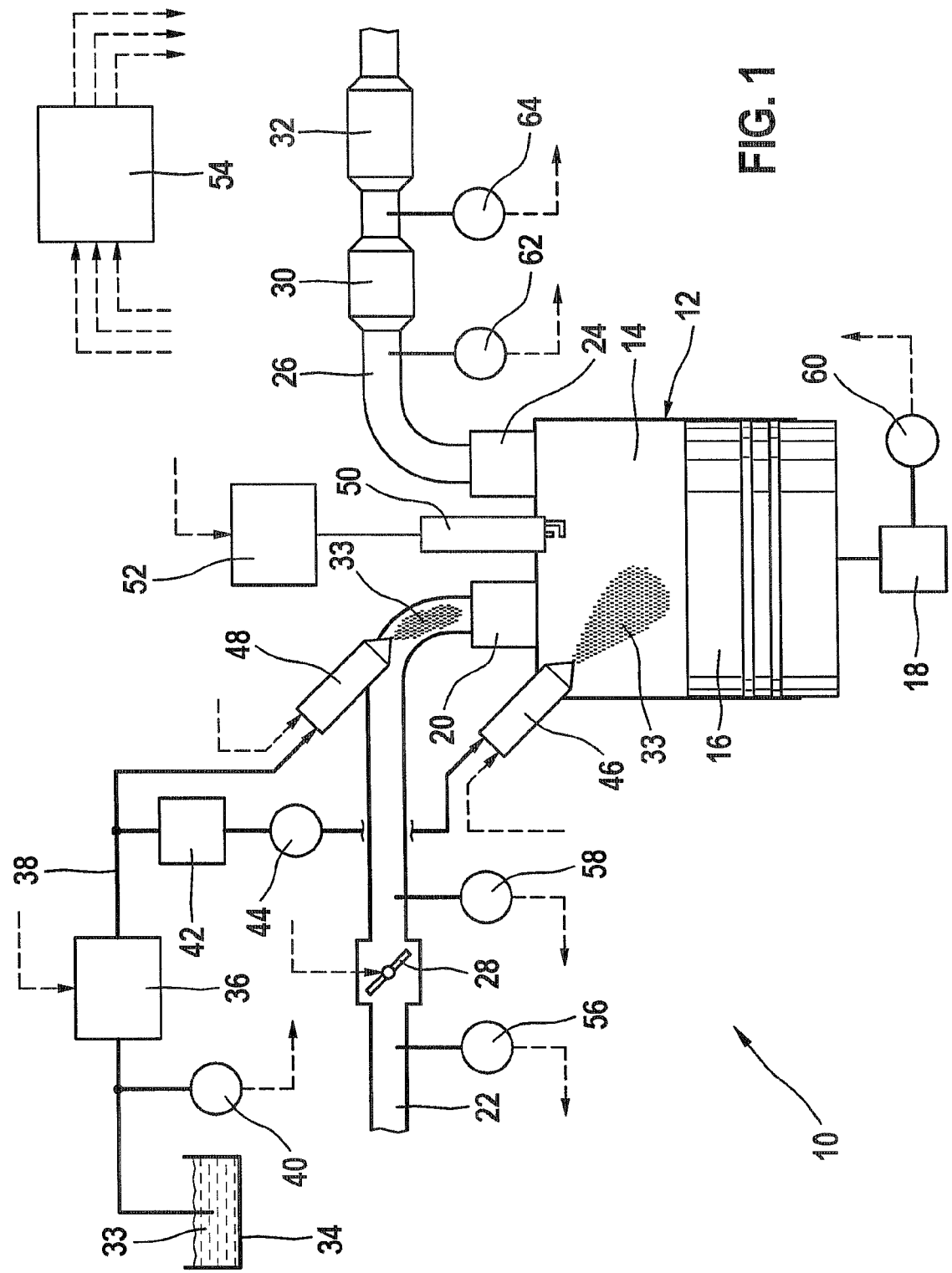
FIG. 1 is a schematic illustration of a first embodiment of an internal combustion engine.

In FIG. 1, an internal combustion engine is identified overall by reference numeral 10. It includes a plurality of cylinders that are essentially constructed identically, but of which in FIG. 1 only one is shown as an example, identified by reference numeral 12. The cylinder 12 has a combustion chamber 14, which is defined by a piston 16. This piston is connected to a crankshaft 18 that is shown only schematically.

Fresh air is delivered to the combustion chamber 14 via an inlet valve 20 and an intake tube 22, while conversely combustion exhaust gases are carried away via an outlet valve 24 and an exhaust tube 26. A throttle valve 28 is disposed in the intake tube, and a precatalytic converter 30 and a main catalytic converter 32 are disposed in the exhaust tube 26.

The engine 10 is operated with different types of liquid fuels, such as ethanol, methanol, gasoline, and arbitrary mixtures of those components. The liquid fuel 33 is stored in a tank 34, from which it is delivered by a low-pressure pump 36 to a low-pressure line 38. The current type of liquid fuel 33 is detected by a sensor 40. In an embodiment not shown, the current type is ascertained from the behavior of the engine with reference to a model. A high-pressure pump 42, among other things, is connected to the low-pressure line 38 and delivers the fuel 33 to a pressure reservoir 44 ("rail"). A first injector 46 is connected to this rail and can inject the fuel 33 directly into the combustion chamber 14.

Also connected directly to the low-pressure line 38 is a second injector 48, which can inject the fuel, directly upstream of the inlet valve 20, into the intake tube 22 associated with the combustion chamber 14. Thus the first injector 46 belongs to a first path over which the liquid fuel 33 can reach the combustion chamber 14, and the second injector 48 belongs to a second path over which the fuel can reach the combustion chamber 14. The first path corresponds to a principle that is also known as "gasoline direct injection", while the second path corresponds to the principle that is also known as "intake manifold injection". The fuel 33 injected into the combustion chamber 14 is ignited by a spark plug 50 that is connected to an ignition system 52.

The operation of the internal combustion engine 10 is controlled and regulated by a control and regulating device 54. This device receives signals from various sensors, thus including the sensor 40 that detects or ascertains the type of liquid fuel 33. It also receives signals from an HFM sensor, which detects the flow rate of air flowing in the intake tube 22, and from a pressure sensor 58, which detects the pressure prevailing in the intake tube 22 downstream of the throttle valve 28. An rpm sensor 60 forwards a signal corresponding to the rpm of the crankshaft 18 to the control and regulating device 54, and two lambda sensors 62 and 64, disposed upstream of the respective catalytic converters 30 and 32, likewise forward corresponding signals. A temperature sensor and a knocking sensor on the cylinder 12 and a pressure sensor on the rail 44 are not shown for the sake of simplicity in the drawing.

Figure 2:
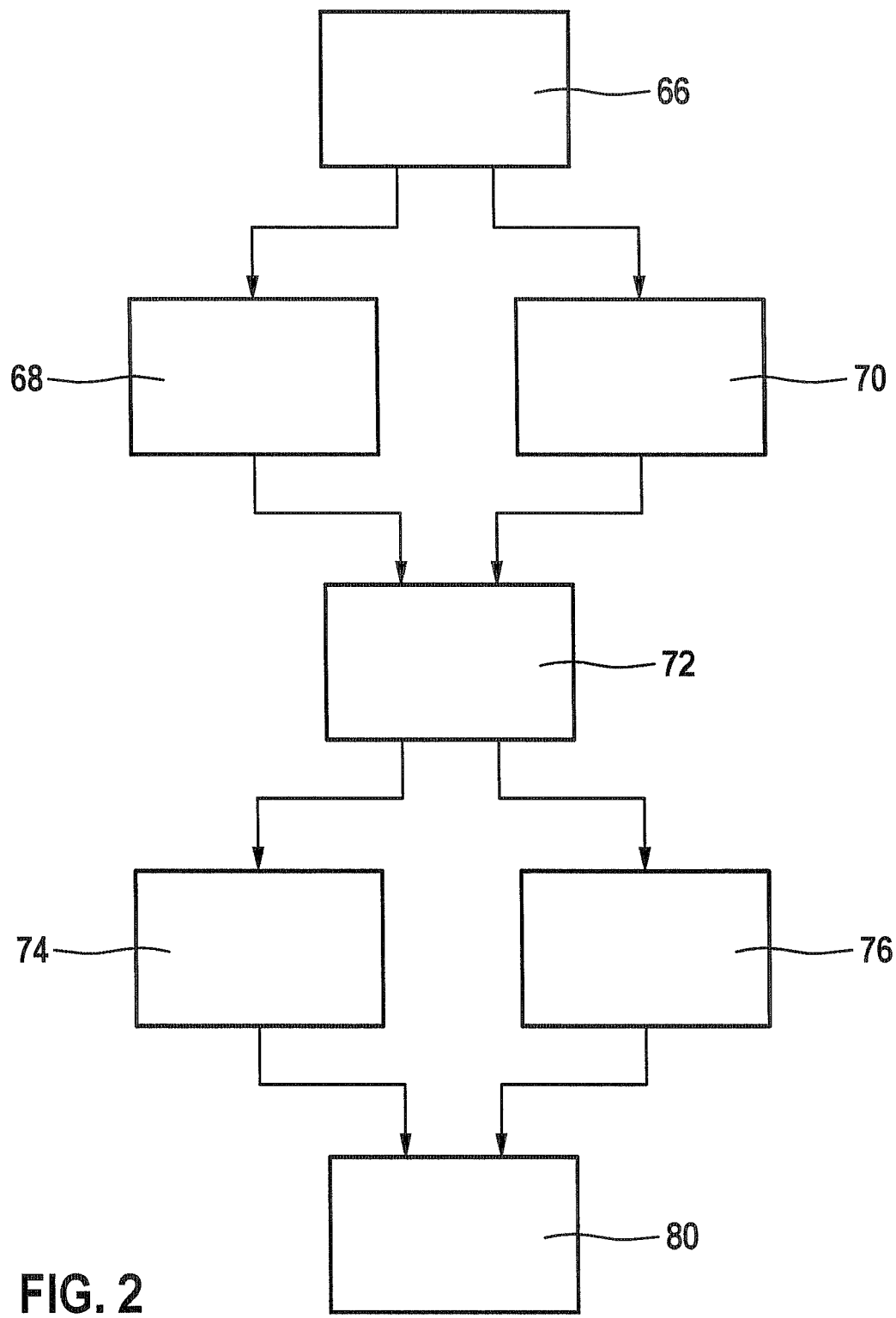
FIG. 2 is a flow chart of a method for operating the engine of FIG. 1.

The engine 10 is operated as follows (see FIG. 2): After a start at 66, the type of liquid fuel 33 currently being used is ascertained by the control and regulating device 54 at 68 on the basis of the signal of the sensor 40. This fuel may be gasoline, ethanol, methanol, or arbitrary mixtures of these substances. Simultaneously, at 70, the current operating system of the engine 10 is ascertained or detected. Such an operating situation may for instance be starting of the engine 10, or it may be defined simply by the desired load or the desired torque and the current rpm. At 72, the control and regulating device 54 ascertains how the fuel quantity required for the current operating situation is to be split to the two injectors 46 and 48. This splitting, that is, the use of the two injectors 46 and 48, is accordingly done as a function on the one hand of the ascertained type of liquid fuel 33 and on the other of the current operating situation, which is defined by various current and desired operating parameters of the engine 10. In accordance with the splitting defined at 72, the injectors 46 and 48 are triggered at 74 and 76. The method ends at 80.

Figure 3:
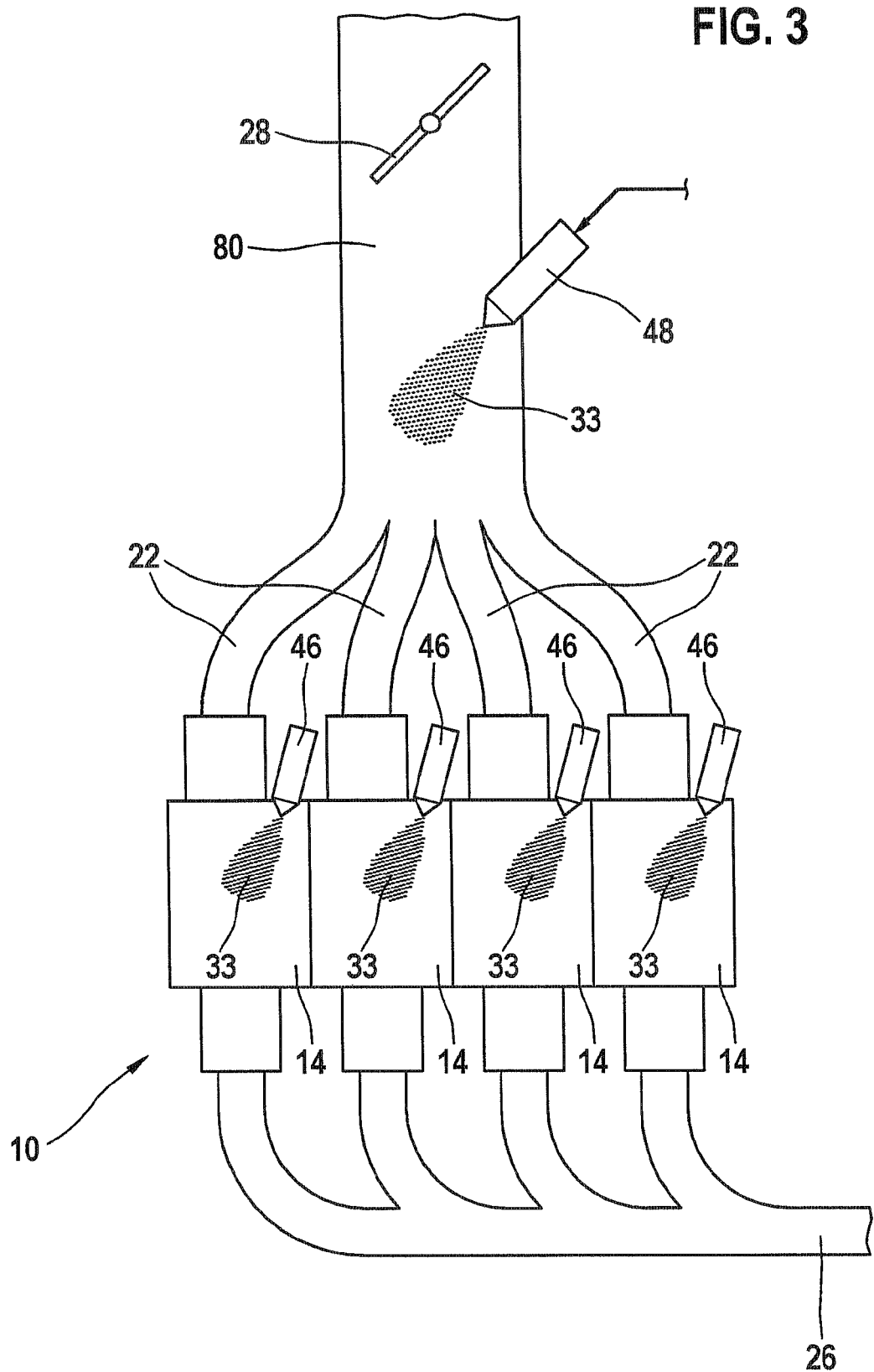
FIG. 3 is a simplified schematic illustration of a second embodiment of an internal combustion engine.

In FIG. 3, a region is shown of an alternative embodiment of an internal combustion engine 10. Those elements and regions that have equivalent functions to elements and regions of the internal combustion engine 10 shown in FIG. 1 are identified by the same reference numerals and will not be described again in detail.

The engine 10 shown in FIG. 3 differs from that in FIG. 1 in that not every intake tube 22 that is associated with a combustion chamber 14 has a respective second injector; instead, there is a single second injector disposed in an intake tube manifold 80 that is present upstream of the intake tubes 22.

The foregoing relates to the preferred exemplary embodiments of the invention, it being understood that other variants and embodiments thereof are possible within the spirit and scope of the invention, the latter being defined by the appended claims.

The invention claimed is:

1. An internal combustion engine, which is operable with different types of liquid fuels, comprising:
    a fuel tank;
    a cylinder defining a combustion chamber;
    a common fuel line in fluid communication with the fuel tank;
    at least two different fuel lines configured to convey fuel from the common fuel line to the combustion chamber;
    a sensor configured to ascertain a current type of liquid fuel in the common fuel line; and
    a control and regulating device configured to control or regulate the use of the at least two different fuel lines as a function of the type of liquid fuel ascertained by the sensor.

2. The internal combustion engine as defined by claim 1, wherein:
    a first fuel line of the at least two different fuel lines, through which liquid fuel can reach the combustion chamber, includes at least a first injector configured to inject liquid fuel directly into the combustion chamber; and
    a second fuel line of the at least two different fuel lines, through which liquid fuel can reach the combustion chamber, includes at least one second injector configured to inject liquid fuel into an intake tube leading to the combustion chamber.

3. The internal combustion engine as defined by claim 2, wherein at least one second injector is associated with each intake tube leading to a combustion chamber.

4. The internal combustion engine as defined by claim 3, wherein at least one second injector is associated with an intake tube manifold, which is associated with a plurality of combustion chambers.

5. The internal combustion engine as defined by claim 3, wherein the first fuel line is designed predominantly for injecting at least essentially pure gasoline.

6. The internal combustion engine as defined by claim 3, wherein the control and regulating device is further configured to control or regulate at least two different fuel lines as a function of at least one further operating parameter of the engine.

7. The internal combustion engine as defined by claim 3, wherein the second injector is included in the second fuel line and located upstream of a high-pressure pump, and the first injector is included in the first fuel line and located downstream of the high-pressure pump.

8. The internal combustion engine as defined by claim 2, wherein at least one second injector is associated with an intake tube manifold, which is associated with a plurality of combustion chambers.

9. The internal combustion engine as defined by claim 8, wherein the first fuel line is designed predominantly for injecting at least essentially pure gasoline.

10. The internal combustion engine as defined by claim 8, wherein the control and regulating device is further configured to control or regulate the at least two different fuel lines as a function of at least one further operating parameter of the engine.

11. The internal combustion engine as defined by claim 8, wherein the second injector is included in the second fuel line and located upstream of a high-pressure pump, and the first injector is included in the first fuel line and located downstream of the high-pressure pump.

12. The internal combustion engine as defined by claim 2, wherein the first fuel line is designed predominantly for injecting at least essentially pure gasoline.

13. The internal combustion engine as defined by claim 2, wherein the control and regulating device is further configured to control or regulate the at least two different fuel lines as a function of at least one further operating parameter of the engine.

14. The internal combustion engine as defined by claim 2, wherein the second injector is included in the second fuel line and located upstream of a high-pressure pump, and the first injector is included in the first fuel line and located downstream of the high-pressure pump.

15. The internal combustion engine as defined by claim 1, wherein the control and regulating device is further configured to control or regulate the at least two different fuel lines as a function of at least one further operating parameter of the engine.

16. A method for operating an internal combustion engine with different types of liquid fuels, comprising:
    ascertaining a current type of liquid fuel in the internal combustion engine with a sensor;
    providing different paths for liquid fuel to reach a combustion chamber of the internal combustion engine; and
    using the different paths based on the current type of liquid fuel ascertained with the sensor.

17. The method as defined by claim 16, wherein the liquid fuel is configured to be injected both directly into the combustion chamber and into an intake tube.

18. An internal combustion engine operable with any of a plurality of fuel types, comprising:
    a fuel tank,
    a cylinder defining a combustion chamber,
    a common fuel line in fluid communication with the fuel tank,
    at least two fuel lines configured to convey fuel from the common fuel line to the combustion chamber, the at least two fuel lines including (i) a first fuel line interposed between the common fuel line and the combustion chamber, and (ii) a second fuel line interposed between the common fuel line and the combustion chamber,
    a sensor configured to ascertain a current type of liquid fuel in the common fuel line, and
    a control and regulating device configured to control or regulate the use of the at least two fuel lines based on the current type of liquid fuel ascertained by the sensor.

19. The internal combustion engine as defined by claim 18, wherein:
    the first fuel line includes a first fuel injector configured to inject liquid fuel directly into the combustion chamber; and
    the second fuel line includes (i) an intake tube directly connected to the combustion chamber, and (ii) a second fuel injector configured to inject liquid fuel directly into the intake tube.

20. The internal combustion engine as defined by claim 18, wherein the control and regulating device is further configured to control or regulate use of the at least two fuel lines based on at least one further operating parameter of the engine.

21. The internal combustion engine as defined by claim 18, wherein:
    the first fuel line includes a first fuel injector interposed between the common fuel line and the combustion chamber; and
    the second fuel line includes a second fuel injector interposed between the common fuel line and the combustion chamber.

22. The internal combustion engine as defined by claim 21, wherein a high pressure pump is included in the first fuel line.

23. The internal combustion engine as defined by claim 22, wherein a low pressure pump is included in the common fuel line.

* * * * *